Oct. 4, 1966  C. E. BLANK, SR  3,276,781
SOLID RING PACKING

Filed Oct. 4, 1963  3 Sheets-Sheet 1

INVENTOR.
CHARLES E. BLANK, SR.
BY
David W. Tibbott
ATTORNEY

Oct. 4, 1966   C. E. BLANK, SR   3,276,781
SOLID RING PACKING

Filed Oct. 4, 1963   3 Sheets-Sheet 2

INVENTOR.
CHARLES E. BLANK, SR.
BY
David W. Tillott
ATTORNEY

Oct. 4, 1966  C. E. BLANK, SR  3,276,781

SOLID RING PACKING

Filed Oct. 4, 1963  3 Sheets-Sheet 3

INVENTOR.
CHARLES E. BLANK, SR.
BY
David W. Tibbott
ATTORNEY

United States Patent Office 3,276,781
Patented Oct. 4, 1966

3,276,781
SOLID RING PACKING
Charles E. Blank, Sr., Painted Post, N.Y., assignor to Ingersoll-Rand Company, New York, N.Y., a corporation of New Jersey
Filed Oct. 4, 1963, Ser. No. 313,846
5 Claims. (Cl. 277—141)

This invention relates to packings or seals used with moving cylindrical rods such as the reciprocating rods of engines or compressors to prevent lubricant or other fluid from leaking along the rods.

Over the years, many different types of packings have been developed for use with reciprocating rods. Of these many types, conventional rubber or plastic seals have been found to be quite satisfactory when used under normal temperatures and pressures but usually cannot be used in such applications because they soften and disintegrate rapidly under high temperatures or extrude under high pressures. Attempts have been made to use rigid types of packings such as a metallic packing with reciprocating rods but none of these attempts have been entirely successful under high pressures since they usually create unduly high pressures on the packing bearing surfaces that break down the lubricating film in the packing and cause wear of both the packing and the rod.

The principal object of this invention is to provide a rod packing which overcomes or substantially minimizes the problems of earlier packings and which is suitable for use under high temperatures and high pressures.

Other objects of this invention include: to provide a rigid type packing which can be used at high temperatures and pressures and prevents substantially all fluid leakage past the packing; to provide a packing which utilizes the fluid pressure to conform it into proper sealing position on a rod; and to provide a packing which automatically seals tighter as the fluid pressure on the packing rises.

In general, the foregoing objects are attained by providing a packing comprising two or more seal rings, each of which has a normal cylindrical interior and a non-circular exterior circumference which is designed so that fluid pressure on the exterior of the ring will cause its interior to distort from its normal circular shape and close down or wrap around a large arc on the surface of the rod to which the packing is applied. Springs are used to press each of the seal rings radially inward against the rod at different points on the periphery of the rod so that the wrapping of a part of the periphery of the rod by each ring can be combined to produce a seal around the entire periphery of the rod. Although each ring wraps around a portion of the rod, sufficient clearance remains between the remainder of the ring and the rod to provide for thermal expansion or contraction of the rod and the ring under abnormal temperatures.

Figure 1:
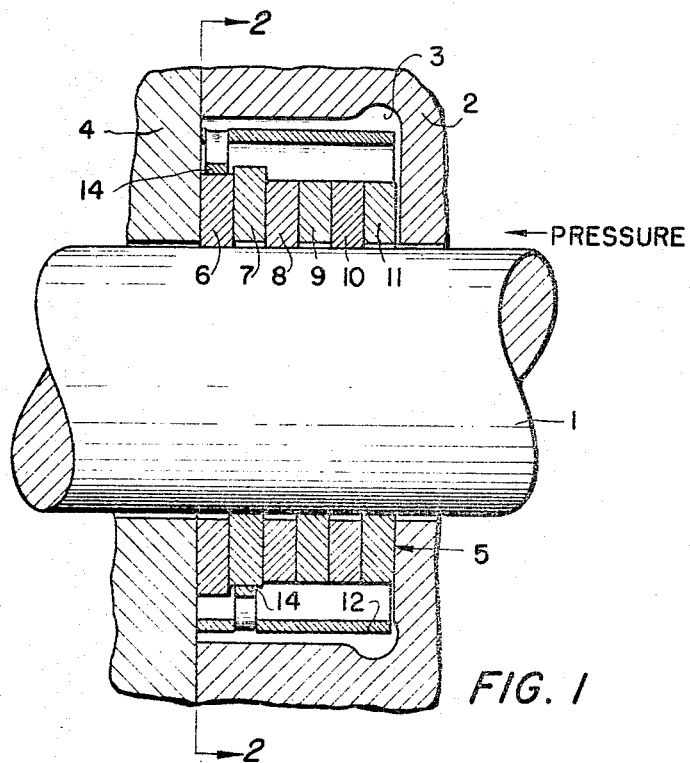
FIG. 1 is an axial section of an embodiment of the invention serving as a packing for a reciprocating machine rod.
Figure 2:
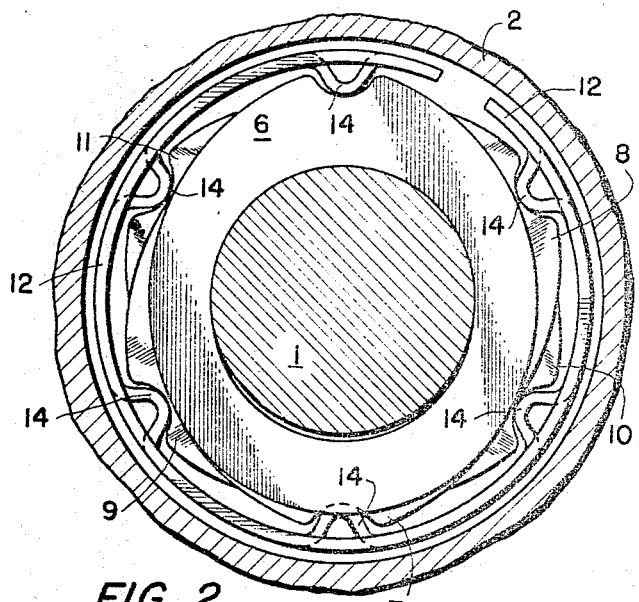
FIG. 2 is a section taken on line 2—2 of FIG. 1.

FIGS. 1 and 2 show a portion of a machine including a conventional reciprocating cylindrical machine rod 1, which, for example, may be the piston rod of a compressor, a portion of a casing 2 containing an annular pocket or cavity 3 surrounding the rod 1 and opening axially outward of the casing 2 and a plate or cover 4 attached to the casing 2 and covering the outer end of the cavity 3. The interior of the casing 2 is under a substantial internal fluid pressure relative to the outside of the casing, such as is the case with a compressor. The packing 5 of this invention is mounted within the cavity 3 to prevent the fluid pressure from escaping from the interior of the casing along the clearance space between the rod 1 and casing 2.

The packing 5 shown in FIGS. 1 and 2 includes a series of sealing rings located inside of the cavity 3 surrounding the rod 1 and an annular spring 12 extending around the rings. Six rings are shown and these are designated with the reference numbers 6 to 11 consecutively starting with the first ring 6 in the outer end of the cavity 3. The annular spring 12 is provided with six U-shaped spring fingers 14 which project radially inward and are angularly and axially spaced from each other. Each of the spring fingers 14 engage one of the seal rings 6 to 11 and presses that ring radially inward against the rod 1.

Each of the seal rings 6 to 11 is identical in shape. Hence, the description of the seal ring 6 should be sufficient for the purposes of this specification. The seal ring 6 is an integral closed ring; i.e., it extends continuously throughout its periphery and is not severed at any point. The inner periphery 15 of the ring 6 is circular, when not under fluid pressure, and has a diameter which is slightly larger than the diameter of the rod 1. The difference in diameters between the ring 6 and rod 1 will depend on several factors, but should be enough to allow the rod 1 to move through the ring freely without binding. For example, if the diameter of the rod is 1.500 inches, the inner diameter of the ring may be larger by .002 to .005 inch.

The outer circumference 16 of the seal ring 6 is non-cylindrical and may be described as oval. It is arranged so that the ring 6 includes two diametrically opposite portions 17 and 18 which are radially thicker than the two remaining diametrically opposite portions 19 and 20. In other words, if the ring 6 is divided into quadrants, two of the quadrants 17 and 18 are radially thicker than the other two quadrants 19 and 20 with the two thicker quadrants 17 and 18 being located diametrically opposite each other and the two thinner quadrants 19 and 20 being located diametrically opposite each other and spaced between the two thicker quadrants 17 and 18.

One of the radially thicker quadrants 17 contains an outward opening notch 21 for receiving a spring finger 14 for pressing the ring 6 radially against the rod 1. The notch 21 prevents the ring 6 from rotating relative to the annular spring 12 and assures that the spring finger 14 will remain located at the proper point on the circumference of the ring 6.

Figure 3:
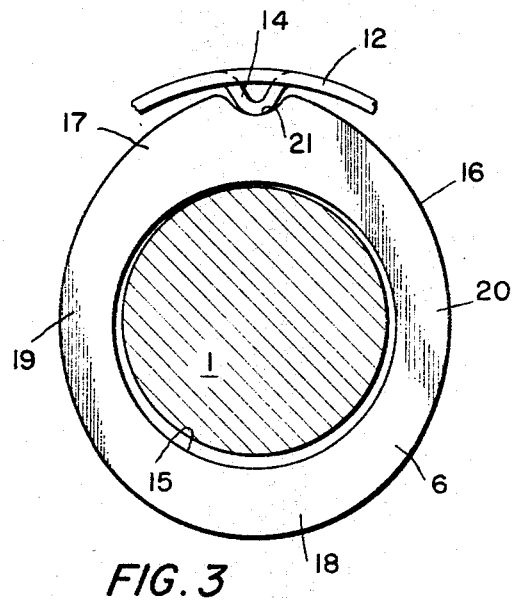
FIG. 3 is a schematic face view of one of the packing rings of the packing shown in FIGS. 1 and 2 illustrating its shape before fluid pressure is applied to it.
Figure 4:
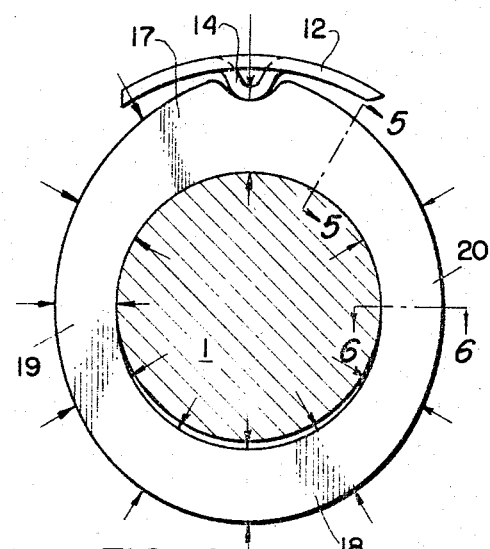
FIG. 4 is a view similar to FIG. 3 showing the packing ring after fluid pressure is applied to it.

FIGS. 3 and 4 illustrate how fluid pressure on the ring 6 causes it to seal the clearance space around the rod 1. FIG. 3 shows the ring 6 before fluid pressure is applied to it. In FIG. 3 the inner periphery 15 is cylindrical and located eccentric to the axis of the rod 1 with the radially thick portion 17 pressed against the rod 1 by a spring finger 14. This is the normal inside shape of the ring 6 before fluid pressure is applied to it.

FIG. 4 shows what happens to the inner periphery 15 of the ring when it is loaded with fluid pressure. It will be understood that fluid pressure in the machine of FIG. 1, shown by the legend in FIG. 1, flows along the rod 1 to both the inner periphery 15 and outer circumference 16 of each of the rings 6 to 11. Due to the area of the outer circumference 16 of the ring 6 being greater than the inner periphery 15, the application of equal fluid pressures on both the inside and outside of the ring produces a resultant force acting to compress the ring radially inward. Because of the non-circular outer circumference 16, this compressing force causes the ring 6 to distort from its original shape, thus the circular inner periphery 15 changes shape and hugs the rod 1 for better than ½ the circumference of the rod. This engaged area of the rod is adjacent the radially thick portion 17 of the seal ring and extends about equally on either side of the notch 21, wherein the spring finger 14 engages the ring 6.

Figure 5:
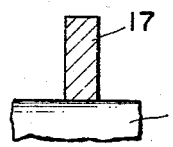
FIG. 5 is a section of FIG. 4 taken on the line 5—5.
Figure 6:
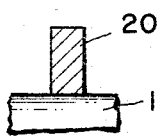
FIG. 6 is a section of FIG. 4 taken on the line 6—6.
Figure 7:
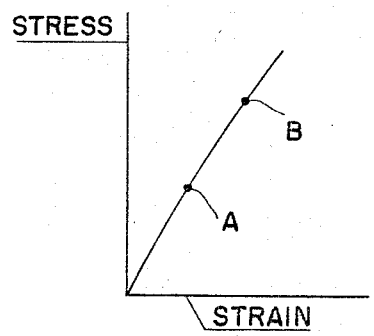
FIG. 7 is a stress-strain diagram of the material comprising the packing rings.

The reason why the ring 6 is distorted under pressure and caused to hug the rod 1 can be explained by the fact that it contains different cross-sectional areas in different quadrants, as shown in FIGS. 5 and 6. Although the resultant compressing pressure around the ring 6 is the same on all quadrants, the differential areas in the different quadrants 17 to 20 cause the stress in the ring 6 to differ. In the radially thick portions 17 and 18, the compressive stress, caused by the exterior compression force, is less than the compressive stress in the radially thin sections 19 and 20. Since the stress in the radially thin portions 19 and 20 is greater, the resulting strain in these portions is also greater. This is illustrated in FIG. 7 showing the familiar stress-strain diagram with the stress strain-values in the thicker quadrants 17 and 18 of the ring 6 being indicated by point A and those in the thinner quadrants 19 and 20 being indicated by point B. Hence, the strain or yielding of the ring 6 caused by the outside force is non-uniform around its circumference with the thinner portions 19 and 20 yielding more than the thicker portions 17 and 18. As a result, the ring is distorted from its normal shape and caused to hug or wrap an arcuate section of the rod 1.

The size and shape of the ring 6 depends on the fluid pressure which it operates under and the characteristics of the material of which it is composed. Examples of suitable materials which have been found to be suitable for the ring 6 are given in the following table which also includes pertinent characteristics of the materials.

of the rod 1 when they are pressed radially inward at diametrically opposite points. In the embodiment of FIG. 1 using six rings, the spring finger 14 for each ring is angularly spaced 180 degrees from the spring fingers of the adjacent rings so that each pair of rings will act as a full seal for the rod circumference. Because of the fact that it takes two rings to form a complete seal, the use of six rings results in three complete seals for the rod circumference.

It should be noted that each pair of rings is loaded with the full discharge pressure on their outsides and a gradient drop of pressure across their inside sealing surfaces.

The use of three pairs of rings provides a gradient drop of pressure across the length of the full set. The differential pressure between the outside to inside surfaces varies across each pair of rings in the stack. Hence, rings 6 and 7 will hug the rod to a greater degree than will rings 8 and 9. By the same reasoning rings 8 and 9 will hug the rod tighter than will rings 10 and 11. This is a desirable feature of this packing since this better distributes the pressure drop and permits the fluid being pumped to do a better job of lubricating and cooling the stacked set of rings.

The end faces of the seal rings 6 to 11 are flat and parallel and are pressed axially outward of the casing and against each other to form seals between each ring to prevent fluid from leaking radially between the inner periphery 15 and outer circumference 16 of each ring. This axial pressure on the rings is created by the fluid pressure in the interior of the casing 2. In addition, the cover 4 is flat on its interior and the rings are pressed axially against the cover to prevent leakage between the ring 6 and the cover 4.

Figure 8:
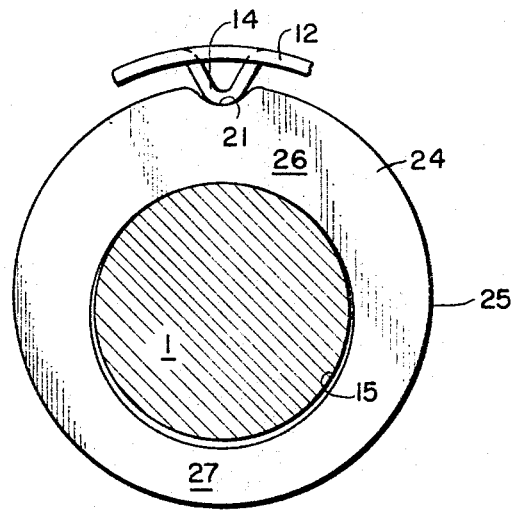
FIG. 8 is a face view of another embodiment of packing ring showing it prior to the application of fluid pressure.
Figure 9:
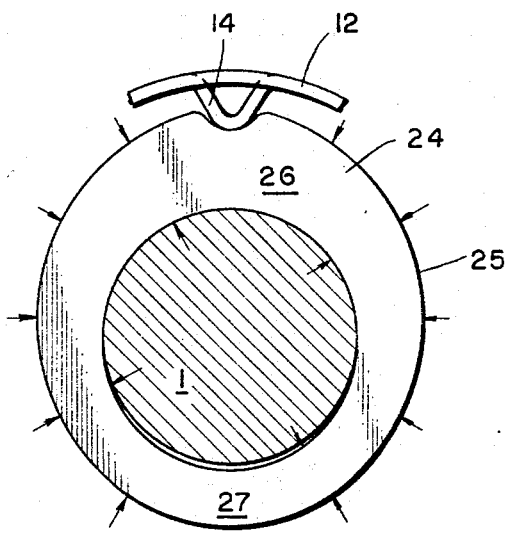
FIG. 9 is a face view of the ring of FIG. 8 after fluid pressure is applied to it.

FIGS. 8 and 9 show another embodiment of seal ring 24. In this embodiment the outer circumference 25 is eccentric relative to its inner periphery 15 and includes a thick half 26 and a thin half 27. The thick half 26 includes a notch 21 which receives a spring finger 14 for pressing the thick half 26 of the ring 24 radially inward against the rod 1.

The application of fluid pressure to the outer circumference 25 of the ring 24 causes the thin half 27 to yield more than the thick half and, as a result, the interior

TYPICAL PROPERTIES OF SOME RING MATERIALS

| Material | Tensile strength, lbs./in.$^2$ | Compressive yield, lbs./in.$^2$ | Hardness | Young's mod. of elasticity | Coefficient of expansion |
| --- | --- | --- | --- | --- | --- |
| Bronze | 25,000 to 60,000 | 12,000 to 25,000 | 60 to 100 Brinell, 500 kg./10 mm. | $10.0 \times 10^6$ to $16.0 \times 10^6$ | $10.0 \times 10^{-6}$ |
| Cast iron | 20,000 to 60,000 | No true yield | 160 to 300 Brinell, 500 kg./10 mm. | $10.0 \times 10^6$ to $20.0 \times 10^6$ | $6.5 \times 10^{-6}$ |
| Nodular iron | 55,000 to 100,000 | 35,000 to 70,000 | 135 to 280 Brinell, 500 kg./10 mm. | $19.0 \times 10^6$ to $25.0 \times 10^6$ | $6.0 \times 10^{-6}$ to $6.4 \times 10^{-6}$ |
| Steel (hardened) | 60,000 to 200,000 | 40,000 to 180,000 | 35 to 62 Rockwell "C." | $30.0 \times 10^6$ | $6.3 \times 10^{-6}$ |
| Cemented carbides and oxides | 200,000 to 260,000 | 100,000 to 500,000 | 85 to 92 Rockwell "A." | $65.0 \times 10^6$ to $105.0 \times 10^6$ | $2.3 \times 10^{-6}$ to $3.5 \times 10^{-6}$ |

It should be noted that packing rings may be manufactured from any of the materials listed, variations of same or materials not here listed. In all cases the material selected for the rings must be suitable for the physical dimensions of the ring, the fluid pressure being pumped, the gradient break down of pressure across any one ring or sets of rings, the initial clearance between the ring and its rod, the bearing pressure desired between the ring and its rod under operation and the maximum operating temperature of the rings and rod.

Preferably, the ring 6 should wrap the circumference of the rod 1 for 180 degrees or slightly more. In this way, two rings can be used to seal the entire circumference periphery 15 of the ring 24 is deformed and caused to wrap or hug the periphery of the rod 1 over about 180 degrees.

FIG. 9 illustrates the wrapping action of the ring 24 along its thick half 26. Except for its different exterior circumference 25, the ring 24 is the same as the seal ring 6 of the first embodiment.

Although several preferred embodiments of the invention are illustrated and described in detail, it will be understood that the invention is not limited simply to these embodiments, but contemplates other embodiments and variations which utilize the concepts and teachings of this invention.

Having described my invention, I claim:

1. A high pressure packing for a cylindrical rod, comprising:
   (a) a plurality of packing rings surrounding the rod and located in face-to-face contact;
   (b) a casing surrounding said packing rings and adapted to contain high pressures acting on the outer circumferences of said rings;
   (c) resilient means located in said casing adjacent the outer circumferences of said rings and acting to bias at least some of said rings radially inward against said rod at circumferentially spaced locations;
   (d) each of said rings having a cylindrical interior and a non-cylindrical outer circumference which provides at least two radially-thick portions and at least two radially-thin portions angularly spaced from said radially-thick portions with said portions being arranged so that the application of substantial fluid pressure to the outer circumferences of the ring places the ring in compression and causes the radially-thin portions to compress or yield more than the radially-thick portions so as to distort said ring from its original cylindrical interior shape and cause it to hug the periphery of the rod over a substantial angle;
   (e) said plurality of packing rings including at least one group of rings comprising at least two rings which are circumferentially spaced relative to each other resulting in said rings in said group cooperating with each other to hug the entire periphery of said rod; and
   (f) each of said rings being composed of a material which allows the ring to be distorted in the foregoing manner by the fluid pressure acting on its outer circumference.

2. The packing of claim 1 wherein said radially-thick portion of said ring is pressed against said rod by said resilient means.

3. The packing of claim 2 wherein the outer circumference of the ring is of a shape so that the fluid pressure causes the ring to hug the periphery of the rod over at least a semi-circle.

4. The packing of claim 2 wherein said fluid pressure also presses said rings axially together to prevent fluid leakage between the engaged faces of adjacent rings.

5. The packing of claim 2 wherein the outer circumference of said ring has a shape so that fluid pressure causes the ring to hug the periphery of the rod over at least a semi-circle and leaves sufficient clearance around the balance of the rod periphery to take care of expansion or contraction of the ring or rod under operating conditions.

References Cited by the Examiner

UNITED STATES PATENTS

| | | | |
|---|---|---|---|
| 803,188 | 10/1905 | Oehlschlaeger | 277—156 |
| 3,050,311 | 8/1962 | Mikell | 277—157 |

LAVERNE D. GEIGER, *Primary Examiner.*

SAMUEL ROTHBERG, *Examiner.*

L. RANEY, J. MEDNICK, *Assistant Examiners.*